US012605301B2

(12) United States Patent
Carlucci et al.

(10) Patent No.: US 12,605,301 B2
(45) Date of Patent: Apr. 21, 2026

(54) MASSAGER

(71) Applicant: CONAIR LLC, Stamford, CT (US)

(72) Inventors: Vito Carlucci, Stratford, CT (US); Christiane Hormann, Norwalk, CT (US)

(73) Assignee: CONAIR LLC, Stamford, CT (US)

( * ) Notice: Subject to any disclaimer, the term of this patent is extended or adjusted under 35 U.S.C. 154(b) by 767 days.

(21) Appl. No.: 17/951,351

(22) Filed: Sep. 23, 2022

(65) Prior Publication Data

US 2024/0099926 A1 Mar. 28, 2024

(51) Int. Cl.
*A61H 7/00* (2006.01)
*A61H 23/02* (2006.01)

(52) U.S. Cl.
CPC ............. *A61H 7/005* (2013.01); *A61H 23/02* (2013.01); *A61H 2201/0107* (2013.01); *A61H 2201/1671* (2013.01); *A61H 2201/1695* (2013.01); *A61H 2201/5002* (2013.01); *A61H 2205/081* (2013.01)

(58) Field of Classification Search
CPC .... A61H 7/00; A61H 7/005; A61H 2007/009; A61H 2015/0007; A61H 2015/0064; A61H 2015/0014; A61H 23/00; A61H 2201/1695
See application file for complete search history.

(56) References Cited

U.S. PATENT DOCUMENTS

| | | | | |
|---|---|---|---|---|
| 6,432,072 | B1 * | 8/2002 | Harris | A61H 23/0254 601/111 |
| 9,295,608 | B2 * | 3/2016 | Ma | A61H 7/004 |
| 2006/0116614 | A1 * | 6/2006 | Jones | A61H 23/0263 601/80 |
| 2008/0154161 | A1 | 6/2008 | Abbott | |
| 2009/0118652 | A1 | 5/2009 | Carlucci | |
| 2014/0276255 | A1 * | 9/2014 | McGushion | A61H 23/0263 601/17 |
| 2016/0213554 | A1 | 7/2016 | Possemato et al. | |
| 2019/0201283 | A1 * | 7/2019 | Moran | A61H 39/04 |
| 2021/0330539 | A1 | 10/2021 | Faussett | |
| 2022/0015988 | A1 | 1/2022 | Williams | |
| 2022/0104997 | A1 * | 4/2022 | Lawrie | A61H 37/00 |
| 2022/0125670 | A1 | 4/2022 | Ma et al. | |
| 2022/0133586 | A1 * | 5/2022 | Furman | A61H 23/0254 601/84 |

OTHER PUBLICATIONS

International Search Report and Written Opinion dated Nov. 30, 2023 from corresponding International Patent Application No. PCT/US2023/030904, 18 pages.

* cited by examiner

*Primary Examiner* — Margaret M Luarca
*Assistant Examiner* — Sarah B Lederer
(74) *Attorney, Agent, or Firm* — Ruggiero McAllister & McMahon LLC

(57) ABSTRACT

A massager includes a massager housing having a first massaging member and a second massaging. The first massaging member and the second massaging member are rotatable during operation of the massager. The massager housing is removably connectable to a handle or a strap.

12 Claims, 7 Drawing Sheets

MASSAGER

BACKGROUND

1. Field of the Disclosure

The present disclosure is related to a massager. In particular, the present disclosure is related to a shiatsu massager that is removably connectable to a handle or a strap.

2. Description of Related Art

Massagers generally are configured for use on limited areas of a user's body. If a user desires massage for areas outside of the areas the particular massager is configured for, then the user has to purchase more than one massager that undesirably increases cost and need for space for storage.

Accordingly, it has been determined by the present disclosure that there is a continuing need for a device that overcomes, alleviates, and/or mitigates one or more of the aforementioned and other deleterious effects of prior devices.

SUMMARY

The present disclosure provides a massager that includes a massager housing having a first massaging member and a second massaging. The first massaging member and the second massaging member are rotatable during operation of the massager. The massager housing is removably connectable to a handle or a strap.

The above-described and other features and advantages of the present disclosure will be appreciated and understood by those skilled in the art from the following detailed description, drawings, and appended claims.

DETAILED DESCRIPTION

Figure 1:
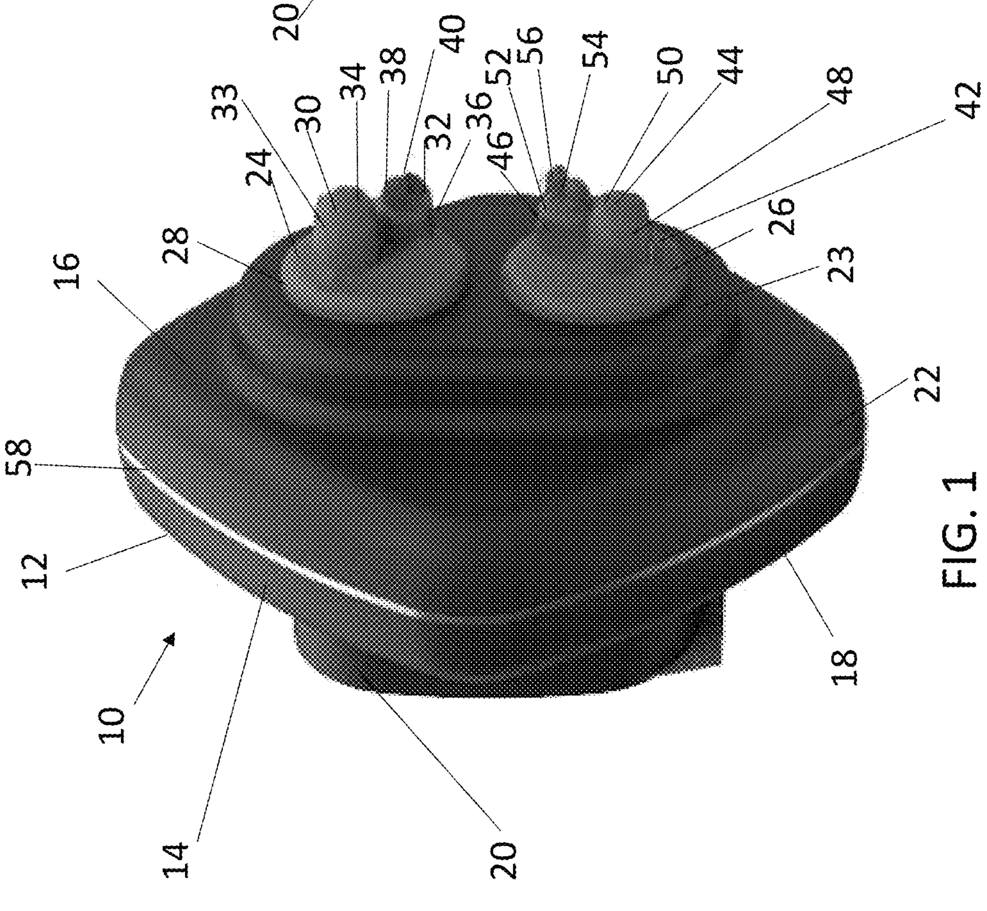
FIG. 1 is a front perspective view of a massager according to the present disclosure.

Referring to the drawings and in particular to FIG. 1, an exemplary embodiment of a massager according to the present disclosure is shown and is generally referred to by reference numeral 10. Advantageously, massager 10 is a shiatsu massager that is removably connectable to a handle or a strap.

Figure 2:
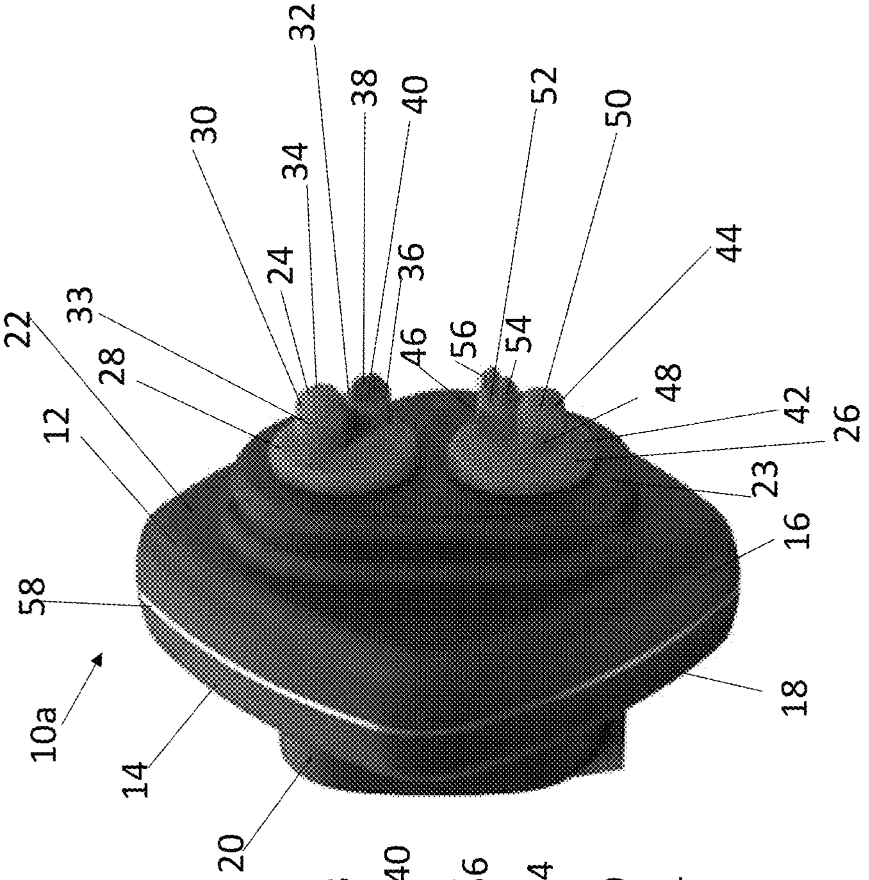
FIG. 2 is a front perspective view of the massager of FIG. 1 that is modified to have a smaller size.
Figure 7:
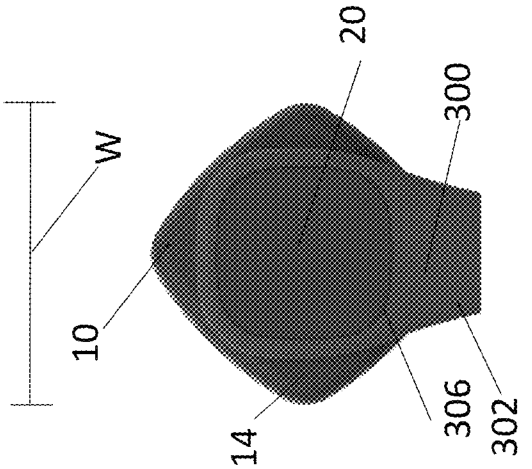
FIG. 7 is a partial rear view of FIG. 3.

Referring to FIG. 1, massager 10 has a massager housing 12. Referring to FIG. 2, massager 10 can be modified to massager 10*a* that is the same as massager 10 except has a smaller size. Massager housing 12 has a connector housing portion 14 connected to a massager housing portion 16. Connector housing portion 14 has a first casing portion 18. Connector housing portion 14 has a connection member 20 extending from casing portion 18. Massager housing portion 16 has a second casing portion 22. Massager housing portion 16 has a raised platform 23 extending from second casing portion 22. Massaging members 24, 26 extend through raised platform 23. Massaging member 24 has a disk portion 28 with a first protrusion 30 and a second protrusion 32. First protrusion 30 has a cylindrical sidewall 33 with a hemispherical top portion 34. Second protrusion 32 has a cylindrical portion 36 and two protuberances 38, 40 extending from cylindrical portion 36. Massaging member 26 has a disk portion 42 with a first protrusion 44 and a second protrusion 46. First protrusion 44 has a cylindrical sidewall 48 with a hemispherical top portion 50. Second protrusion 46 has a cylindrical portion 52 and two protuberances 54, 56 extending from cylindrical portion 52. A support panel 58 is secured between connector housing portion 14 and massager housing portion 16. As shown in FIG. 7, massager 10 can have a width W of 110 millimeters ("mm").

Figure 3:
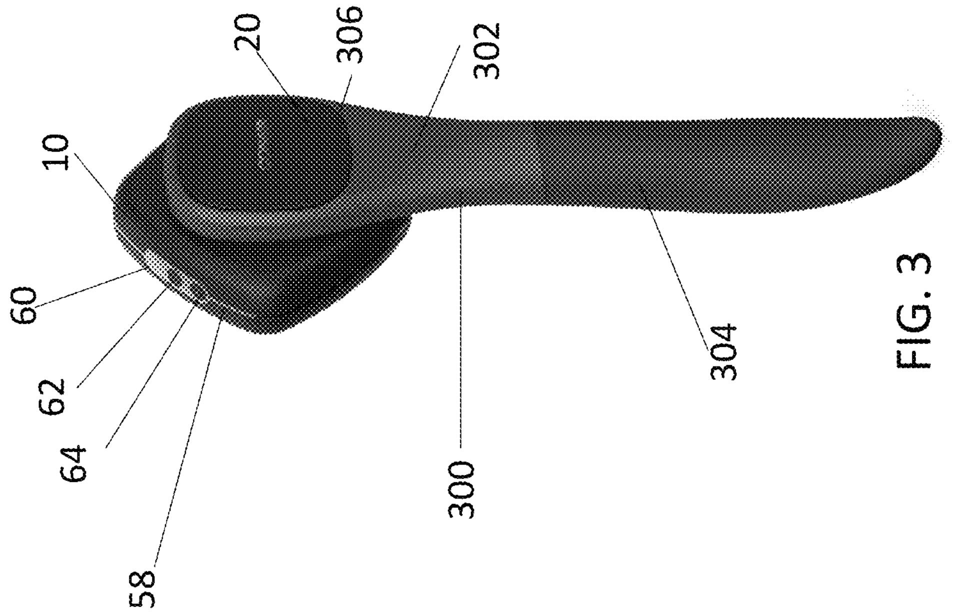
FIG. 3 is a rear perspective view of the massager of FIG. 1 connected to a handle assembly.

Referring to FIG. 3, support panel 58 has a panel portion 60. Buttons 62, 64 extend through panel portion 60. Connector housing portion 14 and massager housing portion 16 can house a controller, for example, a microcontroller unit and printed circuit board that controls operation of massager 10 so that buttons 62, 64 control, activate and deactivate two motors, one for each of massaging member 24 and massaging member 26, and a battery, for example, a lithium-ion cell, that supplies power to the two motors when massager 10 is activated and can be charged by a USB.

Figure 4:
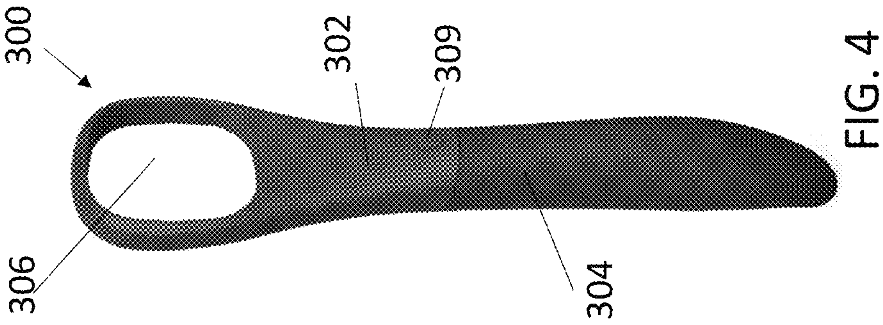
FIG. 4 is a front perspective view of the handle assembly of FIG. 3 that is disconnected from the massager of FIG. 1.

Still referring to FIG. 3, massager 10 is removably connectable to a handle assembly 300. Handle assembly 300 has an attachment member 302 and a gripping member 304. As shown in FIG. 4, attachment member 302 forms a hole 306 on a first end and has an opening 308 (FIG. 5) on a second end that is opposite the first end. Attachment member 302 has a button 309 above opening 308. As shown in FIG. 3, connection member 20 of massager 10 passes through hole 306 to removably connect massager 10 to handle assembly 300 by friction fit or snap fit. Connection member 20 can be rotated 90 degrees from the position shown in FIG. 3 and connect to attachment member 302 in the same way as shown in FIG. 3. Connection member 20 can be rotated 180 degrees from the position shown in FIG. 3 and connect to attachment member 302 again in the same way as shown in FIG. 3. Connection member 20 can be rotated 270 degrees from the position shown in FIG. 3 and connect to attachment member 302 in the same way as shown in FIG. 3.

Figure 5:
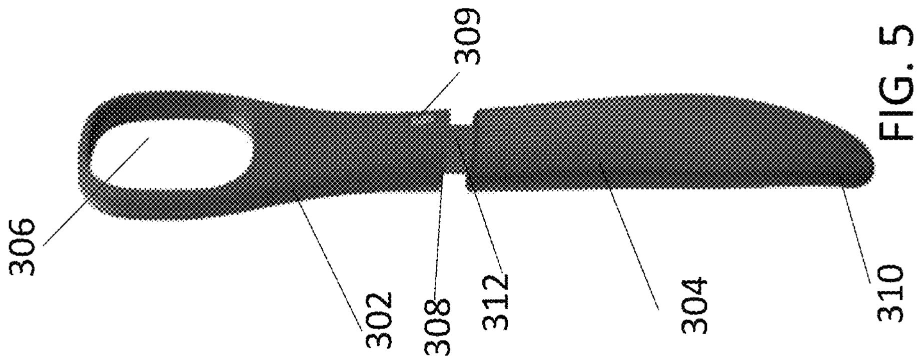
FIG. 5 is a front perspective view of the handle assembly of FIG. 4 having an attachment portion that is partially separated from a gripping portion.
Figure 8:
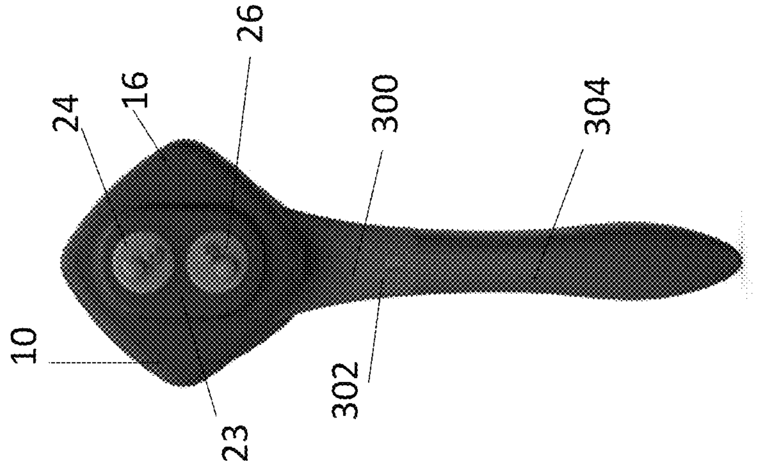
FIG. 8 is a front view of FIG. 3.
Figure 6:
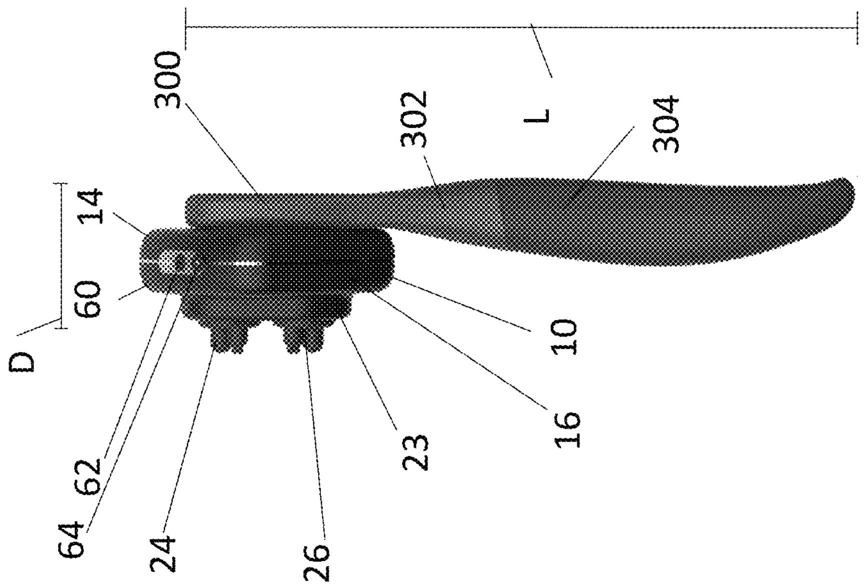
FIG. 6 is a right side view of FIG. 3.

As shown in FIG. 5, gripping member 304 has a free end 310 on a first end and a connector member 312 that extends from a second end that is opposite the first end. As shown in FIGS. 3 and 6-8, connector member 312 of gripping member 304 is positioned in opening 308 of attachment member 302 to removably connect attachment member 302 to gripping member 304 by friction fit or snap fit. Pressing button 309 allows attachment member 302 to move away from gripping member 304 to disconnect attachment member 302 from gripping member 304 or pressing button 309 urges attachment member 302 away from gripping member 304 to disconnect attachment member 302 from gripping member 304. Attachment member 302 can be made of a rigid material, for example, rigid plastic. Gripping member 304 can be made of a flexible material, for example, rubber, or have a flexible material cover a rigid material. The flexible material of gripping member 304 reduces the vibration that transfers to handle assembly 300 during operation of massager 10 and increases comfort when holding handle assembly 300. Attachment member 302 that disconnects from gripping member 304 saves space and allows for small packaging. Referring to FIG. 6, handle assembly 300 can have a length L of 430 mm and the combination of massager 10 and handle assembly 300 can have a depth D of 90 mm.

Figure 10:
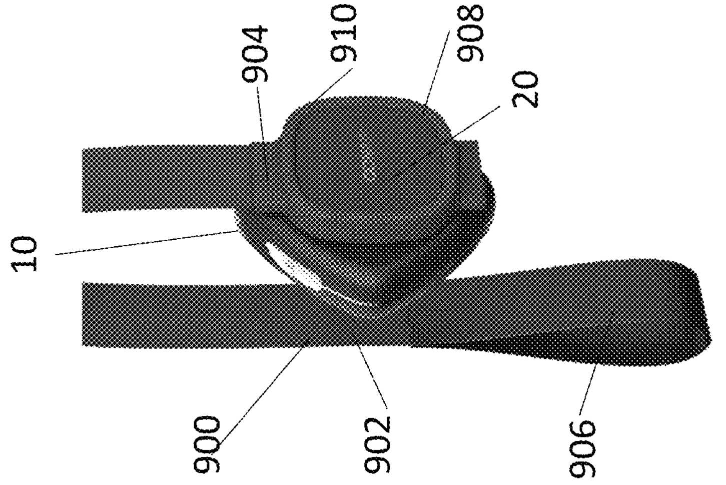
FIG. 10 is a partial rear perspective view of FIG. 9.
Figure 9:
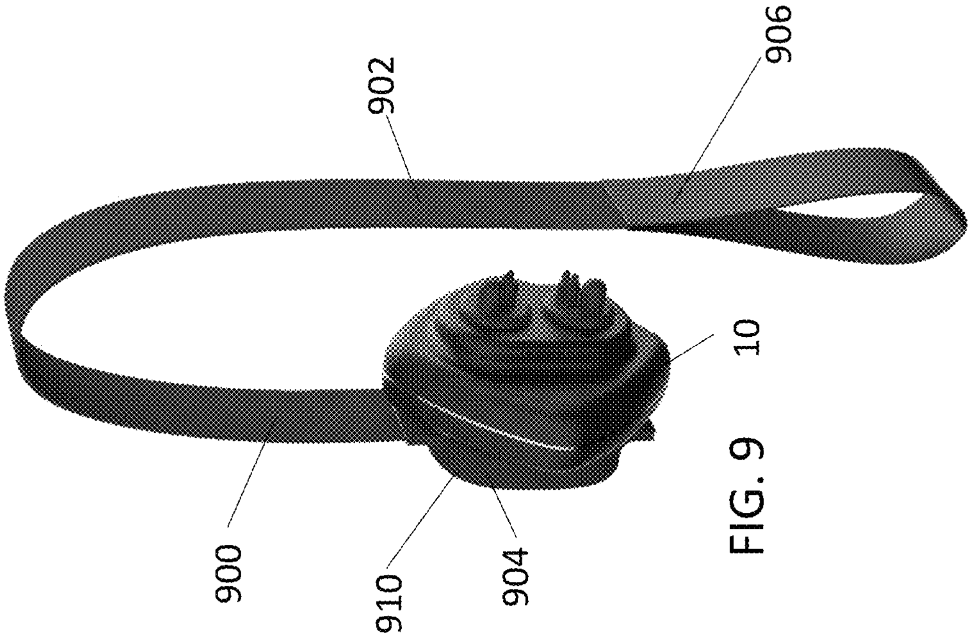
FIG. 9 is a front perspective view of the massager of FIG. 1 connected to a strap assembly.

Referring to FIGS. 9 and 10, massager 10 is removably connectable to a strap assembly 900. Strap assembly 900 has a strap 902 and a connector 904. Strap 902 connects to a loop 906 on a first end and connects to connector 904 on a second end that is opposite the first end. As shown in FIG. 10, connector 904 forms a hole 908 through a frame member 910. Connection member 20 of massager 10 passes through hole 908 of frame member 910 to removably connect massager 10 to strap assembly 900 by friction fit or snap fit. Connection member 20 can be rotated 90 degrees from the position shown in FIG. 9 and connect to connector 904 in the same way as shown in FIG. 9. Connection member 20 can be rotated 180 degrees from the position shown in FIG. 9 and connect to connector 904 in the same way as shown in FIG. 9. Connection member 20 can be rotated 270 degrees from the position shown in FIG. 9 and connect to connector 904 again in the same way as shown in FIG. 9. Strap 902 can be polyurethane.

Referring to FIG. 3, in use, the user presses button 64 to activate massager 10. By pressing button 64, for example, the controller of massager 10 provides power to activate the motors to rotate massaging member 24 and massaging member 26 in the same or opposite directions. For example, the motor can provide shiatsu massage where one of the motors rotates massaging member 24 in a clockwise direction and another of the motors rotates massaging member 26 in a counterclockwise direction so that massaging member 24 and massaging member 26 simultaneously rotate in opposite directions. The user can press button 64 more than one time to change a type of massage of massager 10, or the user can press button 64 for a predetermined amount of time, for example, 2 seconds, to turn massager 10 off by deactivating the motors. For example, by pressing button 64 once power is conducted to the motors for the shiatsu massage, by pressing button 64 twice, power is conducted to the motors for the shiatsu massage and power is conducted to another motor to also simultaneously provide vibration, and by pressing button 64 three times the controller of massager 10 reverses directions of massaging member 24 and massaging member 26 by providing power to activate the one of the motors to rotate massaging member 24 in the counterclockwise direction and the another of the motors rotates massaging member 26 in a clockwise direction so that massaging member 24 and massaging member 26 simultaneously rotate in opposite directions.

The user presses button 62 to change modes of massager 10. For example, by pressing button 62 once the controller of massager 10 activates a low mode, by pressing button 62 twice the controller of massager 10 activates a medium mode where the motors increase in speed to rotate massaging member 24 and massaging member 26 more quickly than in the low mode and/or increase speed of vibration, by pressing button 62 three times the controller of massager 10 activates a high mode where the motors increase in speed to rotate massaging member 24 and massaging member 26 more quickly than in the medium mode and low mode and/or increase speed of vibration.

A user selects to connect massager 10 to handle assembly 300, strap assembly 900 or use massager 10 alone without connecting massager 10 to either handle assembly 300 or strap assembly 900. When using massager 10 alone without connecting massager 10 to either handle assembly 300 or strap assembly 900, the user grips connection member 20 extending from casing portion 18 of housing 12 and presses massaging member 24 and massaging member 26 against a desired portion of the user's body to be massaged when massager 10 is activated or turned on.

Referring to FIG. 3, when using massager 10 with handle assembly 300, the user positions connection member 20 extending from casing portion 18 through hole 306 to removably connect massager 10 to handle assembly 300 by friction fit or snap fit. The user can then press massaging member 24 and massaging member 26 against a desired portion of the user's body to be massaged while the user grips gripping member 304 when massager 10 is activated or turned on. To disconnect massager 10 from handle assembly 300, the user applies a force to massager 10 and/or handle assembly 300 to overcome the friction fit or snap fit to pull massager 10 and handle assembly 300 apart.

Figure 12:
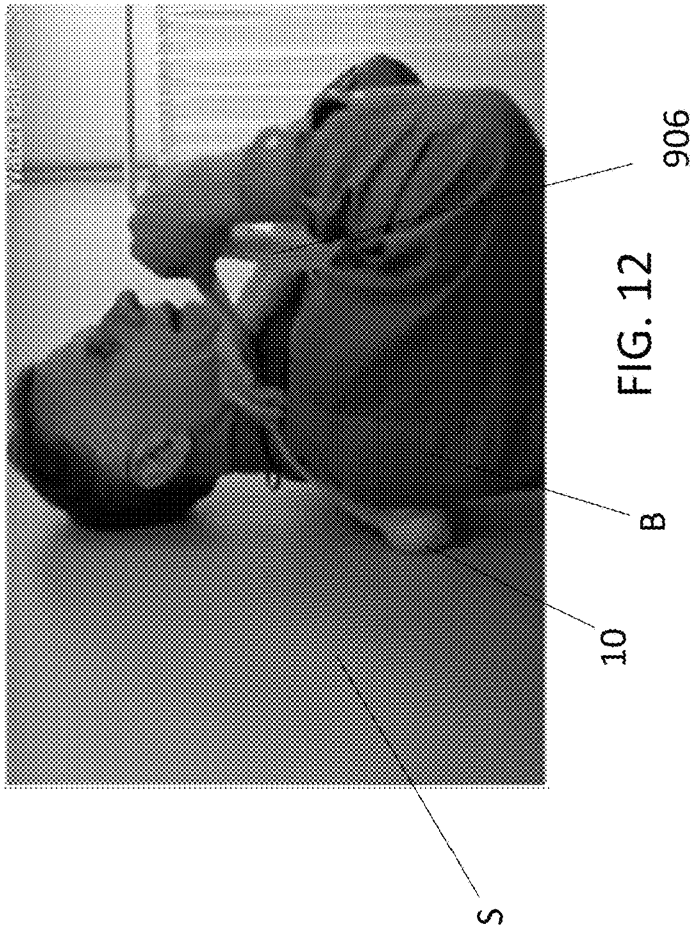
FIG. 12 is a side perspective view of the massager of FIG. 1 that is connected to the strap assembly of FIG. 9 with a strap being gripped by a user so that the massager is between the user and a wall to massage the user's back.

Referring to FIGS. 9 and 10, when using massager 10 with strap assembly 900, the user positions connection member 20 extending from casing portion 18 through hole 908 of frame member 910 to removably connect massager 10 to strap assembly 900 by friction fit or snap fit. Referring to FIG. 12, the user can grip loop 906 and position massager 10 adjacent a portion of a user's body B so that massaging member 24 and massaging member 26 are adjacent a desired portion of the user's body B. The user then moves connection member 20 and frame member 910 against a surface S, for example, a wall, to sandwich massager 10 between the surface S and the user's body B to apply massage to the user's body when massager 10 is activated or turned on. Frame member 910 is made of a material and shaped to protect the surface or wall that frame member 910 contacts while massager 10 between the surface S and the user's body B to prevent leaving scratch marks on the wall or the surface S. To disconnect massager 10 from strap assembly 900, the user applies a force to massager 10 and/or strap assembly 900 to overcome the friction fit or snap fit to pull massager 10 and strap assembly 900 apart. Strap assembly 900 allows massager 10 to be used for the user's back and/or waist.

Figure 11:
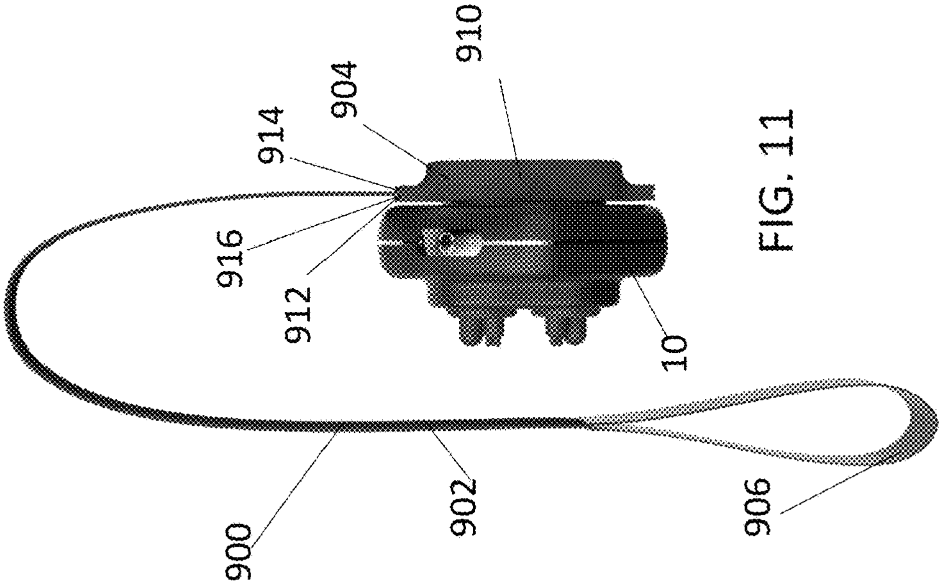
FIG. 11 is a side view of FIG. 9.
Figure 14:
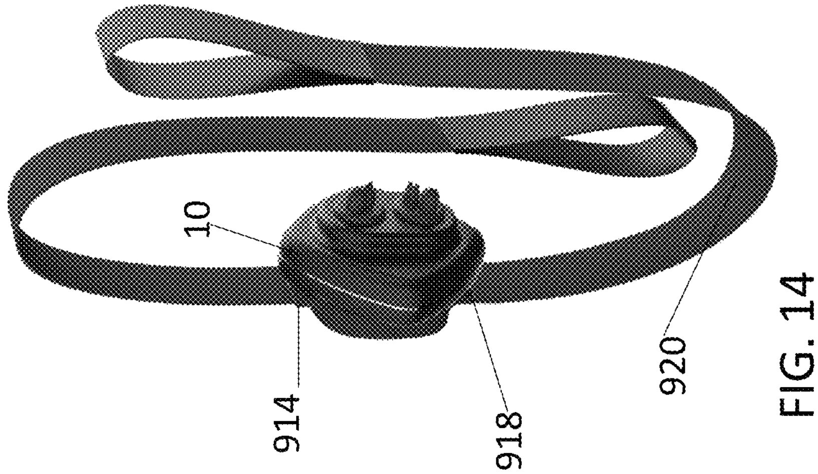
FIG. 14 is a front perspective view of the massager of FIG. 1 connected to two strap assemblies.
Figure 13:
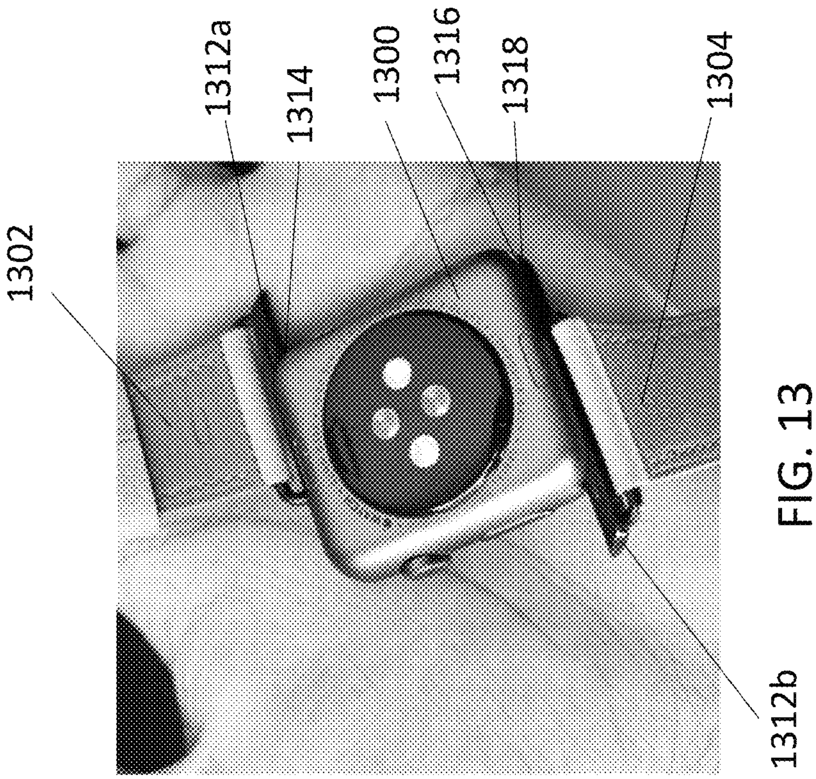
FIG. 13 is an example of connectors used to connect the strap to a connector member of the strap assembly.

Referring to FIG. 11, strap 902 can connect to frame member 910, for example, by a connection member 912 that is on an end of strap 902 opposite loop 906 and a groove 914 formed in frame member 910. Groove 914 has a shape that is complementary to connection member 912 with a slit 916 that has a size allowing strap 902 to pass through while preventing connection member 912 from passing through slit 916. To connect strap 902 to frame member 910, connection member 912 slides into groove 914 from one side similar to the watch 1300 shown in FIG. 13 that has watch band 1302 having a connection member 1312*a* and a watch band 1304 having connection member 1312*b* where watch has grooves 1314, 1316 that each have a shape that is complementary to connection members 1312*a*, 1312*b* with slits 1316, 1318 that each has a size preventing connection member 1312*a*, 1312*b* from passing through slits 1316, 1318. Connection member 912 can be maintained in groove 914 by friction fit. Referring to FIG. 14, frame member 910 can have a groove 918 on an opposite side of frame member 910 that has groove 914 so that a second strap assembly 920 can connect to frame member 910 opposite strap 902. Strap assembly 920 is the same as strap assembly 902. Strap assembly 920 connects to frame member 910 the same as strap assembly 902 connects to frame member 910.

Figure 16:
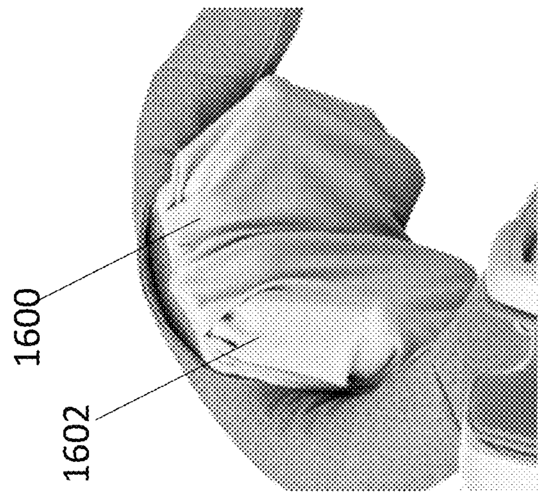
FIG. 16 is a front perspective view of an example cloth cover.
Figure 15:
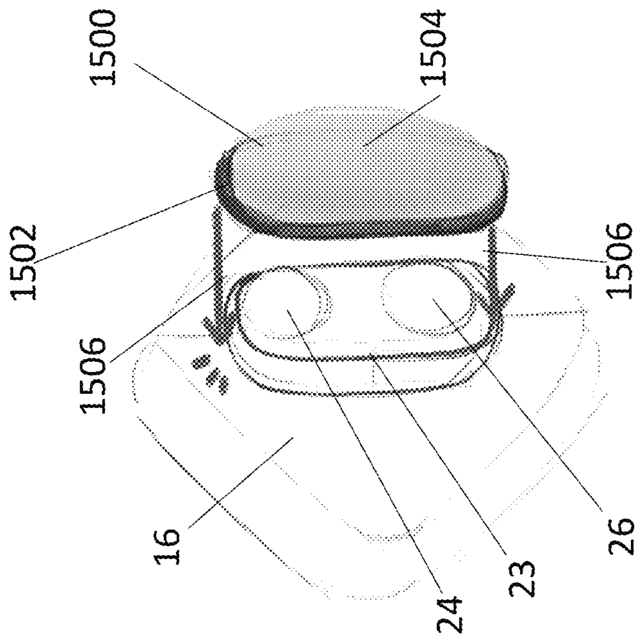
FIG. 15 is a front perspective view of the massager of FIG. 1 disconnected from a cloth cover.

Referring to FIGS. 15 and 16, massager 10 can be modified to have a cloth cover 1500 that covers massaging member 24 and massaging member 26. Cloth cover 1500 has a support member 1502 connected to cloth 1504. Support member 1502 is complementary in shape to raised platform 23 so that support member 1502 can be placed over raised platform 23 as shown by arrows 1506 to be maintained on raised platform 23 by friction fit or snap fit to connect support member 1502 connected to cloth 1504 to massager housing portion 16. Cloth cover 1500 is similar to cloth cover 1600 shown in FIG. 16 of a massager 1602.

Advantageously, massager 10 is a shiatsu massager that is removably connectable to handle assembly 300 or strap assembly 900 and provides a configuration for use on multiple areas of a user's body. This reduces the need for the user to purchase more than one massager to decrease cost and need for space for storage. A further advantage is massager 10 can be sold alone or in combination with handle assembly 300 and/or with a single strap assembly 900 and/or with two single strap assemblies 900.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure should not be limited to the particular embodiment(s) disclosed as the best mode contemplated, but that the disclosure will include all embodiments falling within the scope of the appended claims.

What is claimed is:

1. A massager comprising:

a massager housing having a first massaging member and a second massaging member extending through a platform on a first side of the massager housing, the massager housing having a connection member extending from a casing portion that is on a second side that is opposite the first side, the first massaging member and the second massaging member being rotatable during operation of the massager, the connection member being removably connectable to a handle assembly in a first configuration, the handle assembly having an attachment member and a gripping member, the attachment member forming a hole on a first end, the connection member passing through the hole to removably connect the massager housing to the handle assembly and, when the connection member is disconnected from the handle, the connection member being removably connectable to a strap assembly in a second configuration, the strap assembly having a strap and a frame member, and the strap assembly forming a hole through the frame member so that the connection member of the massager housing passes through the hole of the frame member to removably connect the massager housing to the strap assembly.

2. The massager of claim 1, wherein the first massaging member has a disk portion with a first protrusion and a second protrusion.

3. The massager of claim 2, wherein the first protrusion has a cylindrical sidewall with a hemispherical top portion and the second protrusion has a cylindrical portion and two protuberances extending from the cylindrical portion.

4. The massager of claim 3, wherein the second massaging member has a disk portion with a first protrusion and a second protrusion.

5. The massager of claim 4, wherein the first protrusion has a cylindrical sidewall with a hemispherical top portion and the second protrusion has a cylindrical portion and two protuberances extending from the cylindrical portion.

6. The massager of claim 1, further comprising a support panel between the connector portion and a massager housing portion that has a plurality of buttons extending through a panel portion.

7. The massager of claim 1, wherein the attachment member has an opening on a second end that is opposite the first end and a button above the opening.

8. The massager of claim 1, wherein the connection member can pass through the hole of the attachment member in a first orientation, a second orientation, a third orientation and a fourth orientation, wherein the second orientation is rotated 90 degrees from the first orientation, the third orientation is rotated 180 degrees from the first orientation and the fourth orientation is rotated 270 degrees from the first orientation.

9. The massager of claim 1, wherein the gripping member has a free end on a first end and a connector member that extends from a second end that is opposite the first end, and wherein the connector member of the gripping member is positioned in an opening of the attachment member to removably connect the attachment member to the gripping member.

10. The massager of claim 7, wherein the button urges the attachment member away from the gripping member to disconnect the attachment member from the gripping member.

11. The massager of claim 1, wherein the connection member can pass through the hole of the frame in a first orientation, a second orientation, a third orientation and a fourth orientation, wherein the second orientation is rotated 90 degrees from the first orientation, the third orientation is rotated 180 degrees from the first orientation and the fourth orientation is rotated 270 degrees from the first orientation.

12. The massager of claim 1, wherein the massager vibrates during operation.

* * * * *